(12) United States Patent
Strom et al.

(10) Patent No.: US 6,381,102 B1
(45) Date of Patent: Apr. 30, 2002

(54) HEAD STACK ASSEMBLY REBOUND LATCH FOR A DISK DRIVE

(75) Inventors: Brian Strom, Cupertino; Zia Zahiri, Pleasanton, both of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/374,366

(22) Filed: Aug. 13, 1999

(51) Int. Cl.[7] .................................................. G11B 5/54
(52) U.S. Cl. ....................................................... 360/256
(58) Field of Search ..................... 360/256, 256.1–256.6

(56) References Cited

U.S. PATENT DOCUMENTS

| 5,124,867 A | 6/1992 | Kitahori et al. |
|---|---|---|
| 5,189,576 A | 2/1993 | Morehouse et al. |
| 5,296,986 A | 3/1994 | Morehouse et al. |
| 5,313,354 A | 5/1994 | Sampietro et al. |
| 5,319,511 A | 6/1994 | Lin |
| 5,377,065 A | 12/1994 | Morehouse et al. |
| 5,404,257 A | 4/1995 | Alt |
| 5,477,403 A | 12/1995 | Strickler |
| 5,543,986 A | * 8/1996 | Albrecht |
| 5,602,700 A | 2/1997 | Viskochil et al. |
| 5,982,587 A | * 11/1999 | Alagheband et al. |
| 6,163,440 A | * 12/2000 | Takahashi et al. ....... 360/256.4 |

OTHER PUBLICATIONS

Albrecht, Thomas et al., *Load/Unload Technology Finds Home in Mobile Drives,* Data Storage, vol. 5, No. 10, Sep. 1, 1998. Pp. 29–30, 32, 34, 36 and 38.

* cited by examiner

*Primary Examiner*—Craig A. Renner
(74) *Attorney, Agent, or Firm*—David M. Sigmond; Steven B. Roeder; James P. Broder

(57) ABSTRACT

A latch for retaining a transducer in a landing zone of a disk drive is provided herein. The latch includes a retainer movable between an engaged position and a disengaged position. The retainer retains a head stack assembly near an outer diameter stop in the engaged position. Alternately, in the disengaged position, the retainer allows the head stack assembly to move away from the outer diameter stop. The latch prevents the head stack assembly from bouncing off of the outer diameter stop during an unloading sequence.

18 Claims, 3 Drawing Sheets

US 6,381,102 B1

HEAD STACK ASSEMBLY REBOUND LATCH FOR A DISK DRIVE

FIELD OF THE INVENTION

The present invention relates generally to disk drives for storing data. More specifically, the present invention relates to a crash stop latch which temporarily inhibits the movement of an actuator assembly after the actuator assembly contacts an outer diameter stop for a ramp load, disk drive.

BACKGROUND

Disk drives are widely used in computers and data processing systems for storing information in digital form. In conventional Winchester disk drives, a transducer "flies" upon an air bearing or cushion in very close proximity to a storage surface of a rotating data storage disk. The storage surface carries a thin film of magnetic material having a multiplicity of magnetic storage domains that may be recorded and read back by the transducer.

For a multiple disk, disk drive, a plurality of transducers are supported near the storage surfaces of the storage disks with a plurality of actuator arms. More specifically, each transducer is secured to one actuator arm with a load beam and a head suspension having a suspension gimbal. Typically, an actuator motor moves the actuator arms along a predetermined path to position the transducers relative to the storage surfaces of the storage disks. The combination of the transducers, the load beams, the head suspensions, the actuator arms, and the voice coil motor are commonly referred to as a head stack assembly.

The air bearing which enables each transducer to fly in close proximity to the surface of the disks, is created by air flow generated by rotation of the disks. When the disk rotation ceases, the air bearing dissipates and the transducers are no longer supported above the surfaces of the disks. Thus, when power is removed from a spindle motor that rotates the storage disks, the transducers come to "rest" or "land" on the surfaces of the disks. Likewise, when the spindle motor is powered up, the transducers "take off" from the surfaces of the disks. The landing and/or taking off from the storage disk can lead to loss of data and/or failure of the disk drive due to erosion or scarring of the magnetic film on the surfaces of the disks.

In some disk drives, the actuator motor positions each transducer over a landing zone as power is removed from the spindle motor. This inhibits the transducer from resting on an area of useful data storage during non-rotation of the storage disk. In one design, the actuator motor moves the transducers radially outward so that each head suspension slides onto a ramp positioned near an outer diameter of the storage disks. In this position, each transducer is "unloaded" from the storage disks. Typically, at the end of the desired range of motion, the head stack assembly contacts an outer diameter stop which inhibits additional outward movement.

Unfortunately, if the velocity of the head disk assembly is too great during the unloading of the transducers, the head stack assembly bounces off the outer diameter stop and the transducers swing back towards the disks. Depending upon the timing and the amount of impact force, this can cause rebounding of the head stack assembly away from the outer diameter stop and loading of the transducers back onto the decelerating storage disks. Additionally, the impact with the outer diameter stop can induce large pitch and roll vibrations of each transducer about the suspension gimbal. This can cause transducer contact with the storage disk and severe disk and/or transducer damage. Moreover, the transducers may end up stuck in an arbitrary location on the disks once rotation stops. This also can result in disk damage, transducer damage and/or total drive failure.

One attempt to solve the problem includes designing the outer diameter stop to absorb and dissipate as much impact energy as possible. This minimizes the amount of energy stored in the outer diameter stop during impact and minimizes the rebound energy returned to the head stack assembly. Additionally, power to the head stack assembly can be limited to prevent high speed impacts with the outer diameter stop. Unfortunately, neither approach is entirely satisfactory.

In light of the above, it is an object of the present invention to provide a reliable, simple, and efficient device which effectively inhibits the transducers from rebounding onto the disks during shut down. Still another object of the present invention is to provide a device which inhibits disk or transducer damage during unloading of the transducers. Yet another object of the present invention is to provide a latch for a disk drive which is relatively easy and cost effective to manufacture, assemble and use.

SUMMARY

The present invention is directed to a latch for a disk drive that satisfies these objectives. The disk drive includes a storage disk, a head stack assembly and an outer diameter stop which limits the outward rotation of the head stack assembly. As provided herein, the latch selectively restrains the head stack assembly with a transducer positioned in a landing zone of the disk drive. More specifically, the latch includes a retainer that is movable between an engaged position and a disengaged position. In the engaged position, the retainer temporarily retains the head stack assembly near the outer diameter stop with the transducer in the landing zone. In the disengaged position, the retainer allows the head stack assembly to move away from the outer diameter stop.

Importantly, the latch inhibits the head stack assembly from rebounding away from the outer diameter stop after impact between the head stack assembly and the outer diameter stop. This reduces the potential of the transducer impacting the storage disk and reduces the potential for damage to the transducer and the storage disk. Additionally, the latch may allow the design requirements for the outer diameter stop for absorbing energy to be relaxed. Further, the latch may allow the actuator motor to move the transducer to the loading zone, using maximum available current, without rebounding the transducer back onto the decelerating storage disk.

Typically, the retainer includes a retainer hub and a latch hook. The retainer hub rotates around a latch pin relative to a drive housing of the disk drive. The latch hook engages or contacts the head stack assembly in the engaged position and inhibits rotation of the head stack assembly.

The latch also includes a mover which moves the retainer from the disengaged position to the engaged position. Similar to the retainer, the mover includes a mover hub that rotates around the latch pin relative to the drive housing. The mover can include a contact section which engages the head stack assembly. The engagement between the contact section and the head stack assembly causes the mover to rotate relative to the latch pin and move the retainer relative to the latch pin into the engaged position. The mover can also include a weighted segment which facilitates the mover rotating the retainer.

A connector connects the mover to the retainer. In one embodiment, the connector is a spring which connects the mover to the retainer. The spring allows for movement of the mover to result in movement of the retainer. Further, a spring constant of the spring is selected to adjust the amount of time the retainer remains in the engaged position.

Additionally, the latch includes a return connected to the retainer. The return moves the retainer from the engaged position to the disengaged position. This allows the head stack assembly to move the transducer from the landing zone. For ease of assembly, the return can be a spring that is attached to the retainer and the drive housing. The spring constant for the spring of the return is also selected to adjust the amount of time the retainer remains in the engaged position.

The present invention also includes a method for selectively restraining the transducer in the landing zone. The method includes the steps of providing a retainer, moving the retainer to the engaged position after the head stack assembly is moved to near the outer diameter stop and subsequently moving the retainer to the disengaged position.

Importantly, the latch inhibits the head stack assembly from rebounding away from the outer diameter stop after impact between the head stack assembly and the outer diameter stop. This reduces the likelihood of the transducer impacting the storage disk and reduces the potential for damage to the transducer and the storage disk. Further, with this design, the actuator motor can be allowed to move the transducers to the landing zone using maximum available current.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
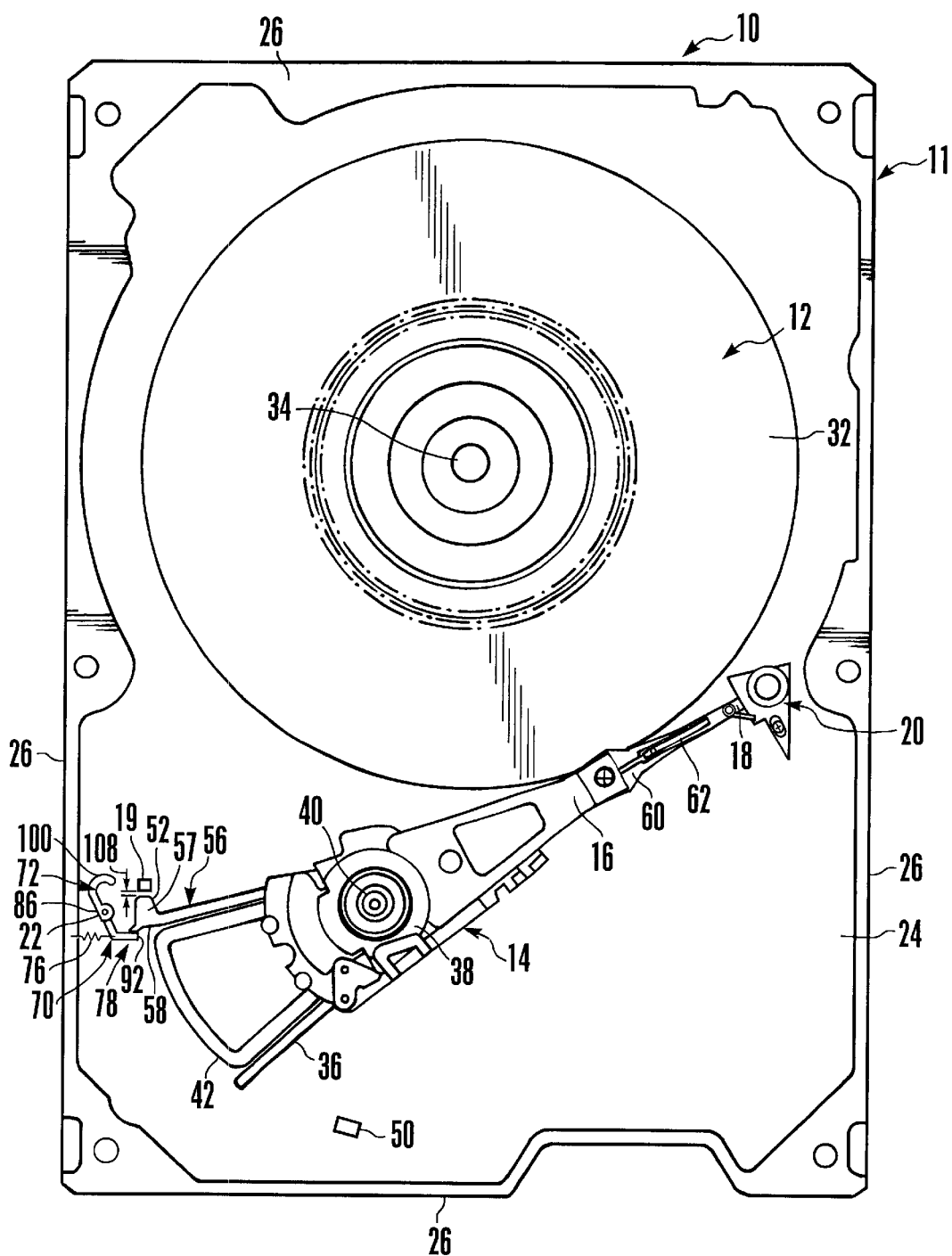
FIG. 1 is a simplified, top plan view of a disk drive including a latch having features of the present invention.

Referring initially to FIG. 1, a disk drive 10 according to the present invention includes (i) a drive housing 11, (ii) at least one storage disk 12, (iii) a head stack assembly 14 having one or more actuator arm(s) 16 for positioning one or more transducer(s) 18 proximate the storage disk(s) 12, (iv) an outer diameter stop 19, (v) a landing zone 20, and (vi) a latch 22. As provided herein, the latch 22 temporarily inhibits the rotation of the actuator assembly 14 away from the outer diameter stop 19. This holds the transducer(s) 18 in the landing zone 20 of the disk drive 10, thereby inhibiting damage to the storage disk(s) 12 and/or the transducer(s) 18 during drive 10 shutdown.

A detailed description of the various components of a disk drive 10 is provided in U.S. Pat. No. 5,319,511, issued to Lin, and assigned to Quantum Corporation, the assignee of the present invention. The contents of U.S. Pat. No. 5,319,511 are incorporated herein by reference. Accordingly, only the structural aspects of a disk drive 10 which are particularly significant to the present invention are discussed and illustrated herein.

The drive housing 11 retains the various components of the disk drive 10. The drive housing 11, illustrated in FIG. 1, includes a base 24 and four (4) side walls 26. A typical drive housing 11 also includes a cover (not shown for clarity), which is spaced apart from the base 24 by the side walls 26.

The storage disks 12 store data in a form that can be subsequently retrieved if necessary. A magnetic storage disk 12 is commonly used to store data in digital form. Alternately, for example, each storage disk 12 can be optical or magneto-optical. For conservation of space, each storage disk 12 preferably includes a data storage surface 32 on each side of the storage disk 12. These storage surfaces 32 are typically divided into a plurality of narrow, annular regions (not shown) of different radii, commonly referred to as "tracks." Those skilled in the art will recognize that the present invention is capable of being used in a disk drive 10 having one or more storage disks 12. For example, the disk drive 10 can include four (4), six (6), nine (9), or twelve (12) spaced apart storage disks 12.

The storage disk(s) 12 are rotated on a disk spindle 34 that is journalled to the drive housing 11 and rotates about a spindle axis relative to the drive housing 11. The disk spindle 34 is rotated at a predetermined angular velocity by a disk motor (not shown). The rotation rate of the storage disks 12 varies according to the design of the disk drive 10.

The head stack assembly 14 includes (i) the one or more actuator arms 16 for retaining the transducers 18 proximate each storage surface 32 of each storage disk 12 and (ii) an actuator motor 36 for moving the actuator arms 16. In the embodiment shown in the Figures, each actuator arm 16 is attached to and cantilevers from an actuator hub 38. In this embodiment, the actuator hub 38 is mounted to and rotates relative to an actuator shaft 40 on an actuator bearing assembly (not shown). This allows the actuator hub 38 to rotate about an actuator axis that is substantially parallel with the spindle axis.

The actuator motor 36 precisely moves the actuator hub 38, the actuator arms 16 and the transducers 18 relative to the storage disks 12. Basically, the actuator motor 36 moves each transducer 18 between the plurality of annular tracks defined on the storage surfaces 32 of the disks 12 and the landing zone 20.

The actuator motor 36 can be implemented in a number of alternate ways. For example, in the embodiment shown in the Figures, the actuator motor 36 is a rotary voice coil motor. In this embodiment, activation of the actuator motor 36 rotates the actuator hub 38 and moves the actuator arms 16 over the concentric data tracks on the disks 12.

Only a portion of the actuator motor 36 is illustrated in the Figures for clarity. Typically, the actuator motor 36 includes a flat, trapezoidal coil 42 that is attached to the actuator hub 38. The coil 42 is disposed between a pair of spaced apart permanent magnets (not shown) and a pair of spaced apart flux return plates (not shown) which are secured to the drive housing 11. The magnets have pole faces of opposite polarity directly facing opposite legs of the coil 42. The resultant magnetic fields are such that current passing through the coil 42 in one direction causes rotation of the actuator arms 16 in one radial direction relative to the disks 12 (such as the radially outward direction) while reverse current causes reverse direction movement (such as the radially inward direction). Thus, the actuator motor 36 is able to bi-directionally rotate the head stack assembly 14 relative to the drive housing 11 around the actuator axis.

Typically, the head stack assembly 14 is movable by the actuator motor 36 through a range of limited angular displacement. This limited movement allows the head stack assembly 14 to position the transducer(s) 18 at the desired data track. Further, during shut down of the disk drive 10, the actuator motor 36 positions the transducer(s) 18 in the landing zone 20.

Preferably, the disk drive 10 includes an inner diameter stop 50, as well as the outer diameter stop 19, to limit the rotary travel of the head stack assembly 14. Referring to FIG. 1, the inner diameter stop 50 and the outer diameter stop 19 are secured to the drive housing 11. The inner diameter stop 50 prevents the head stack assembly 14 from crashing the transducers 18 into the disk spindle 34. The outer diameter stop 19 prevents the head stack assembly 14 from moving the transducer 18 radially outward past the landing zone 20.

Referring to FIGS. 1–4, the head stack assembly 14 includes an actuator contact section 52 which contacts the latch 22 and the outer diameter stop 19. The actuator contact section 52 moves with the head stack assembly 14 relative to the drive housing 11. In the embodiments illustrated herein, the actuator contact section 52 is a finger 56 which cantilevers away from the actuator hub 38. A distal end 57 of the finger 56 includes a laterally extending actuator catch 58 which engages the latch 22 as described below.

Each transducer 18 is secured to one of the actuator arm(s) 16 with a load beam 60 and a head suspension 62. Typically, each load beam 60 is flexible in a direction perpendicular to the storage disk 12 and acts as a spring for supporting the transducer 18. The head suspension 62 connects the transducer 18 to the load beam 60. Each head suspension 62 includes a suspension gimbal (not shown) and a plurality of electrical traces. As the disk 12 rotates, air flow between the transducer 18 and storage disk 12 causes the transducer 18 to ride at an aerodynamically stabilized distance from the storage surface 32 of the storage disk 12. Each load beam 60 is resilient and biased to urge each transducer 18 towards the storage surface 32.

Each transducer 18 interacts with one storage surface 32 to access or transfer information to the storage disk 12. For a magnetic storage disk 12, the transducer 18 is commonly referred to as a read/write head. To read or access data from a magnetic storage disk 12, the transducer 18 produces electronic read signals in response to the passage of the tracks on the storage surface 32 of the disk 12. To write or transfer data to the disk 12, the transducer 18 generates a magnetic field which is capable of polarizing the desired region of the storage surface 32.

Figure 6:
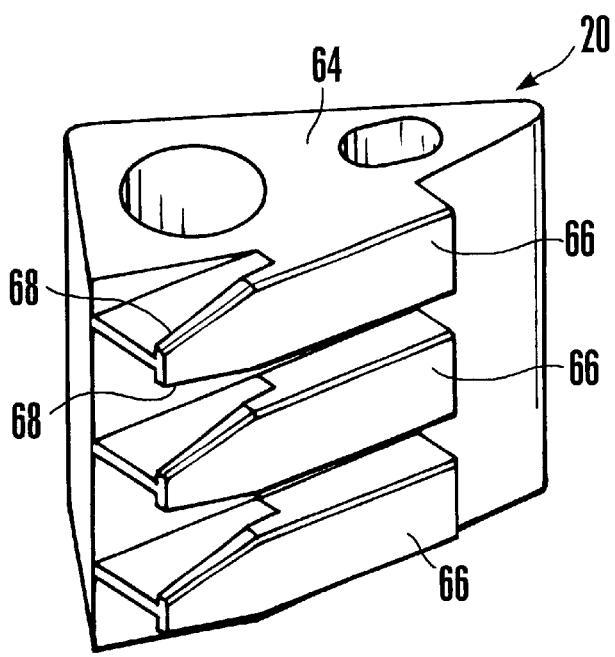
FIG. 6 is a perspective view of a landing zone having features of the present invention.

As provided herein, the disk drive 10 includes the landing zone 20 for parking the transducers 18 during non-rotation of the storage disks 12. In the embodiment illustrated, the landing zone 20 is positioned radially outward from the outer diameter of the storage disks 12. FIG. 6 illustrates a perspective view of a landing zone 20 which can be used with the present invention. The landing zone 20 includes a triangular shaped, landing body 64 and a plurality of spaced apart, wedge shaped projections 66 which cantilever away from the body 64. The landing body 64 is secured to the drive housing 11 near the storage disks 12. Each projection 66 includes a pair of spaced apart ramps 68. Each ramp 68 contacts one head suspension 62 and holds the respective transducer 18 away from the storage disk 12 during starting and stopping of the disk drive 10. When the disks 12 are not rotating, the head suspension 62 rests on the ramp 68 in the landing zone 20 to prevent data loss caused by contact between the transducer 18 and the storage surface 32.

The latch 22 inhibits the head stack assembly 14 from rebounding away from the outer diameter stop 19 after a high speed impact between the head stack assembly 14 and the outer diameter stop 19. Stated another way, the latch 22 temporarily inhibits the rotation of the head stack assembly 14 and retains the transducer 18 in the landing zone 20 when the disk 12 is not spinning at a nominal speed, such as 5,400 RPM. This prevents damage to the storage surface 32 when the transducer 18 is not flying on an air bearing generated by the rotation of the disk 12. This also reduces the potential of the transducer 18 impacting the storage disk 12 and reduces the likelihood of damage to the transducer 18 and/or the storage disk 12.

Figure 3:
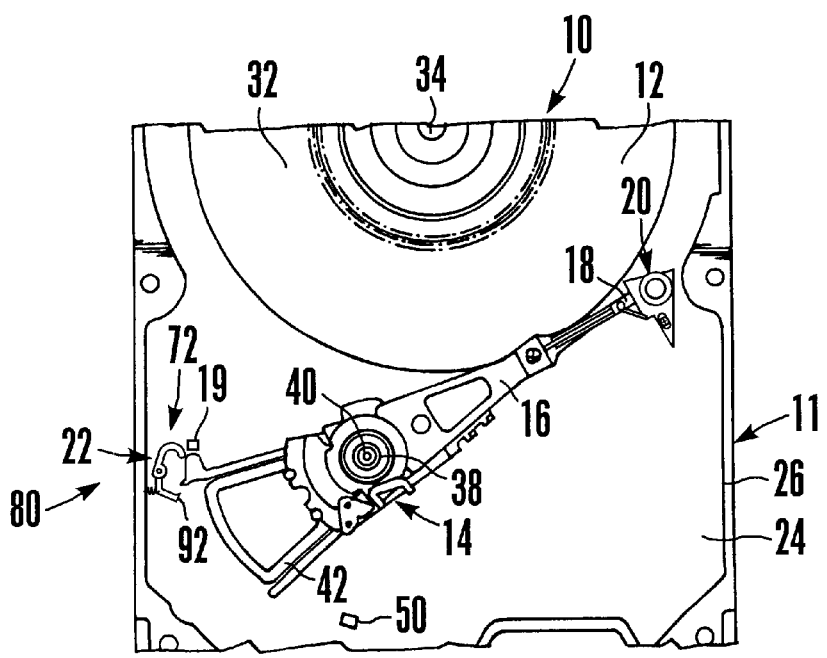
FIG. 3 is a simplified, top plan view of a portion of the disk drive of FIG. 1 with the latch in the disengaged position.
Figure 4:
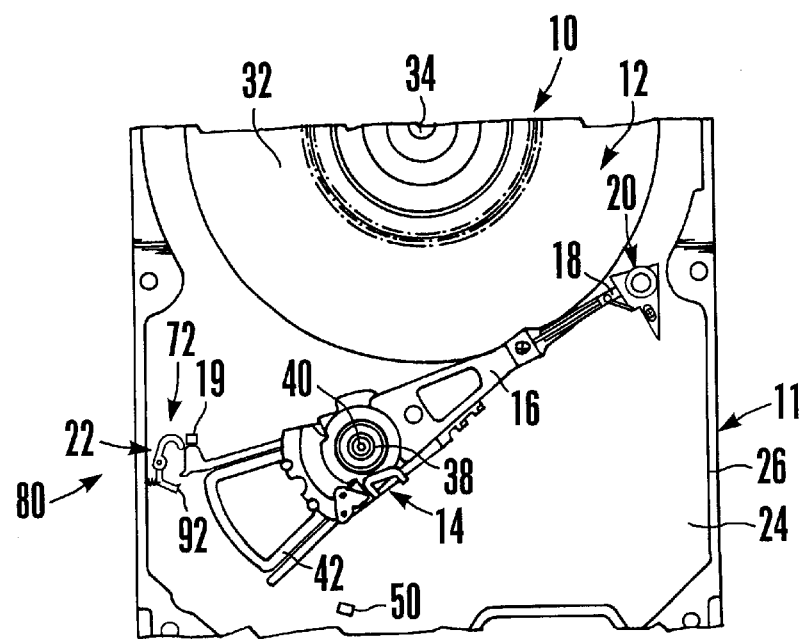
FIG. 4 is a simplified, top plan view of a portion of the disk drive of FIG. 1 with the latch moving from the disengaged position towards the engaged position.
Figure 5:
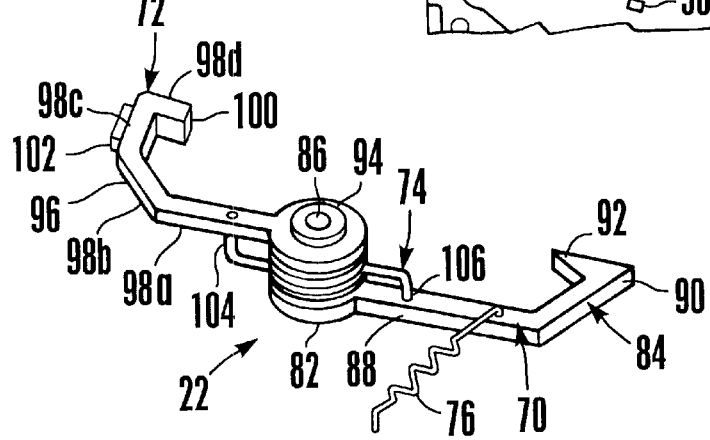
FIG. 5 is an enlarged, perspective view of the latch and a latch pin having features of the present invention.

Referring to FIG. 5, the latch 22 includes a retainer 70, a mover 72, a connector 74 and return 76. As an overview, FIGS. 1–4 illustrate the interaction between the components of the latch 22, the outer diameter stop 19 and the head stack assembly 14. The retainer 70 is movable between an engaged position 78 (illustrated in FIG. 1) and a disengaged position 80 (illustrated in FIGS. 2–4). In the engaged position 78, the retainer 70 temporarily retains the head stack assembly 14 near the outer diameter stop 19 with the transducer 18 in the landing zone 20. In the disengaged position 80, the retainer 70 allows the head stack assembly 14 to move away from the outer diameter stop 19.

Referring to FIG. 5, the retainer 70 includes a retainer hub 82 and a retainer arm 84. The retainer hub 82 is tubular and rotates around a latch pin 86 which is secured to the drive housing 11 (as illustrated in FIG. 1). The retainer arm 84 includes a first section 88 and second section 90 which are attached together. The first section 88 cantilevers away from the retainer hub 82. The second section 90 cantilevers away from the first section 88 at approximately a right angle. The second section 90 includes a wedge shaped, latch hook 92 which engages or contacts the head stack assembly 14 in the engaged position and inhibits rotation of the head stack assembly 14 away from the landing zone 20. In the embodiments illustrated, the latch hook 92 engages the actuator catch 58.

The mover 72 moves the retainer 70 from the disengaged position 80 to the engaged position 78. In the embodiment illustrated, the mover 72 includes a mover hub 94 and a mover arm 96. The mover hub 94 rotates around the latch pin 86 relative to the drive housing 11. The mover arm 96 includes four substantially straight segments 98a–98d which are attached end to end to form a mover arm 96 which is somewhat similar to a "J". The first segment 98a is secured to the mover hub 94. The fourth segment 98d includes a contact section 100 which engages the head stack assembly 14. As provided below, engagement between the contact section 100 and the head stack assembly 14 causes the mover arm 96 to move and rotate relative to the latch pin 86.

The mover arm 96 can also include a weighted segment 102 which facilitates the mover 72 moving the retainer 70. The weighted segment 102 is a rectangular shaped and weighs approximately 0.5 gram. The weighted segment 102 is secured to the third segment 98c of the mover arm 96. However, the weight and positioning of the weighted segment 102 can be altered to adjust the amount of time the retainer 70 remains in the engaged position 78.

The connector 74 mechanically connects the mover 72 to the retainer 70. In the embodiments illustrated herein, the connector 74 is a spring which encircles the latch pin 86 and connects the mover 72 to the retainer 70. The connector 74 includes a first end 104 secured to the mover arm 96 and a second end 106 secured to the retainer arm 84. The spring dampens relative movement between the mover 72 and the retainer 70. A spring constant of the spring is selected to adjust the amount of time the retainer 70 remains in the engaged position 78.

The return 76 moves the retainer 70 from the engaged position 78 to the disengaged position 80 and subsequently holds the retainer 70 in the disengaged position 80. Stated another way, the return 76 biases the retainer 70 to return to the disengaged position 80. This allows the head stack assembly 14 to move the transducer 18 from the landing zone 20. For the embodiment illustrated, the return 76 is a spring that is attracted to the retainer arm 84 and one of the side walls 26 of the drive housing 11. A spring constant of the return spring is selected to adjust the amount of time the retainer 70 remains in the engaged position 78.

As illustrated in FIG. 1, the latch 22 is configured to allow the head stack assembly 14 to move a travel distance 108 away from the outer diameter stop 19 when the retainer 70 is in the engaged position 78. This configuration allows the latch 22 to move between the engaged position 78 and the disengaged position 80 without undue interference by the head stack assembly 14. It is believed that a travel distance 108 of between about 0.5 mm and 10.0 mm can be utilized.

Importantly, the latch 22 inhibits the head stack assembly 14 from rebounding away from the outer diameter stop 19 after a high speed impact between the head stack assembly 14 and the outer diameter stop 19. This reduces the potential of the transducers 18 impacting the storage disks 12 and reduces the potential for damage to the transducers 18 and the storage disks 12. Additionally, this may relax the requirements of the outer diameter stop 19 for absorbing energy. Further, this may allow the actuator motor 36 to use maximum available current to move the transducers 18 to the landing zone 20 without rebounding too far off the outer diameter stop 19.

OPERATION

Figure 2:
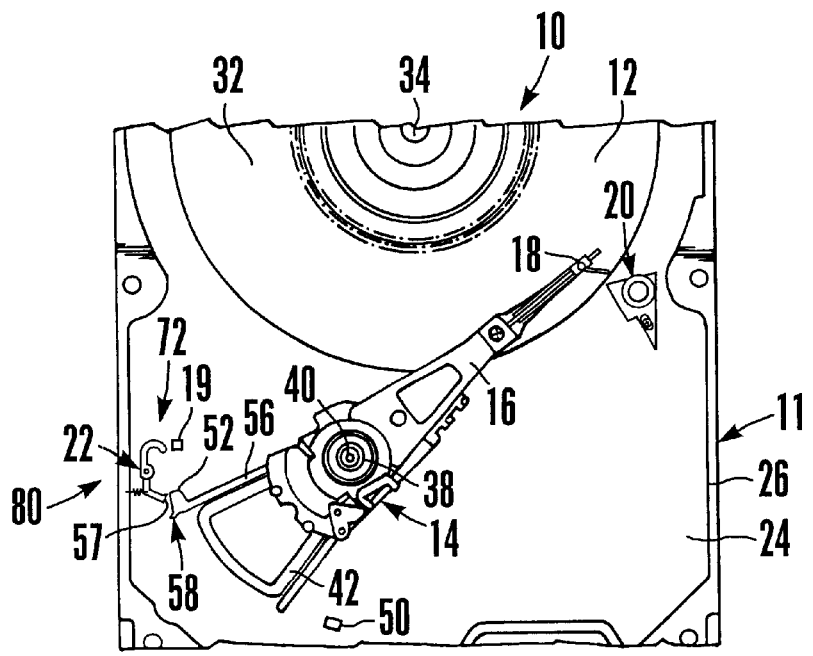
FIG. 2 is a simplified, top plan view of a portion of the disk drive of FIG. 1 with a latch in a disengaged position.

The interaction between the latch 22, the outer diameter stop 19 and the head stack assembly 14 can probably best be understood with reference to FIGS. 1–4. FIG. 2 illustrates the latch 22 in the disengaged position 80.

In the disengaged position 80, the actuator motor 36 is able to position the transducer 18 at the desired track on the storage disk 12. As illustrated in FIG. 3, during shutdown of the disk drive 10, the actuator motor 36 moves the transducer(s) 18 radially outward towards the landing zone 20. At this time, the latch contact section 100 of the latch 22 is closer to the actuator contact section 52 than the outer diameter stop 19. Additional movement of the head stack assembly 14 in a clockwise direction results in impact between the actuator contact section 52 and the latch contact section 100. As illustrated in FIG. 4, this impact results in rotation of the mover 72 in a counter-clockwise direction around the latch pin 86. Subsequently, the actuator contact section 52 contacts the outer diameter stop 19 to prevent the head stack assembly 14 from moving the transducer(s) 18 radially outward past the landing zone 20.

Rotation of the mover 76 in the counter-clockwise direction causes the connector 74 to pull the retainer 70 from the disengaged position 80 towards the engaged position 78. Thus, sufficient movement of the mover 76 in the counter-clockwise direction causes rotation of the retainer 70 in the counter-clockwise direction. Stated another way, the mover 76 temporarily overcomes the bias of the return 76 and moves the retainer 70 to the engaged position 78. In this position, the latch hook 92 engages the actuator catch 58 and prevents the actuator motor 36 from rotating in a radially inward direction relative to the storage disks 12. FIG. 1 illustrates the retainer 70 in the engaged position 78 holding the head stack assembly 14 the travel distance 108 away from the outer diameter stop 19. Thus, the retainer 70 keeps the transducers 18 from rebounding farther away from the outer diameter stop 19 than the travel distance 108. In this position, the retainer 70 maintains the transducers 18 in the landing zone 20 and prevents the transducers 18 from rebounding onto the storage disk 12.

Subsequently, the return 76 overcomes the rotational movement of the mover 72 and subsequently pulls the retainer 70 from the engaged position 78 back to the disengaged position 80. In this position, the head stack assembly 14 is able to rotate to move the transducers 18 out of the landing zone 20. Further, the rotation of the retainer 70 to the disengaged position 80 also causes the retainer 70 to pull the mover 72 via the connector 74 to near the outer diameter stop 19.

Importantly, the size of the weighted segment 102, the spring constant for the connector 74 and the spring constant of the return 76 can be adjusted to adjust the amount of time the latch 22 is in the engaged position 78. For example, a higher spring constant for the return 76 will result in the latch 22 remaining in the engaged position 78 for a relatively short period of time. Alternately, increasing the weight of the weighted segment 102 will result in the latch 22 remaining in the engaged position 78 for a longer period of time. Importantly, with the unique design provided herein, the latch 22 moves from the engaged position 78 to the disengaged position 80 automatically after an appropriate time frame.

While the particular disk drive 10, as herein shown and disclosed in detail, is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A latch for a disk drive, the disk drive including a storage disk, a head stack assembly which moves a transducer relative to the storage disk, and a landing zone positioned near an outer diameter of the storage disk, the latch comprising:

a retainer movable between an engaged position and a disengaged position, the retainer inhibiting the head stack assembly from moving the transducer from the landing zone to the storage disk when the retainer is in the engaged position, the retainer allowing the head stack assembly to move the transducer from the landing zone to the storage disk when the retainer is in the disengaged position;

a mover for moving the retainer from the disengaged position to the engaged position; and a resilient connector which resiliently connects the mover to the retainer, the resilient connector allowing the mover to move relative to the retainer.

2. The latch of claim 1 further comprising a latch pin that supports the resilient connector, wherein the mover and the retainer are rotatably mounted to the latch pin.

3. A disk drive including the latch of claim 1 and the landing zone positioned near the outer diameter of the storage disk, the landing zone supporting the transducer away from the storage disk when the retainer is in the engaged position.

4. The latch of claim 1 further comprising a return connected to the retainer, the return moving the retainer from the engaged position to the disengaged position.

5. The latch of claim 4 wherein the return is adapted to allow the retainer to remain in the engaged position momentarily before moving the retainer from the engaged position to the disengaged position.

6. A latch for a disk drive, the disk drive including a storage disk and a head stack assembly which moves a transducer relative to the storage disk, the latch comprising:
   a retainer movable between an engaged position and a disengaged position, the retainer inhibiting movement of the head stack assembly when the retainer is in the engaged position, the retainer allowing the head stack assembly to move when the retainer is in the disengaged position;
   a mover connected to the retainer, the mover being adapted to move the retainer from the disengaged position to the engaged position, the mover including a contact section which engages the head stack assembly, the engagement between the contact section and the head stack assembly causing the mover to move the retainer from the disengaged position to the engaged position; and
   a resilient connector which resiliently connects the mover to the retainer, the resilient connector allowing the mover to move relative to the retainer.

7. The latch of claim 6 wherein the resilient connector is a latch spring.

8. The latch of claim 6 wherein the mover includes a weighted segment which facilitates the mover moving the retainer.

9. The latch of claim 6 further comprising a return connected to the retainer, the return moving the retainer from the engaged position to the disengaged position.

10. The latch of claim 8 wherein the return is adapted to allow the retainer to remain in the engaged position momentarily before moving the retainer from the engaged position to the disengaged position.

11. A latch for a disk drive, the disk drive including a storage disk, a head stack assembly which moves a transducer relative to the storage disk, and an outer diameter stop which limits the movement of the head stack assembly near an outer diameter of the storage disk, the latch comprising:
   a retainer movable between an engaged position and a disengaged position, the retainer retaining the head stack assembly near the outer diameter stop when the retainer is in the engaged position, the retainer allowing the head stack assembly to move away from the outer diameter stop when the retainer is in the disengaged position;
   a mover for moving the retainer from the disengaged position to the engaged position, the mover being adapted to move relative to the retainer, the mover including a contact section which engages the head stack assembly, the contact section being positioned near the outer diameter stop, wherein engagement between the contact section and the head stack assembly causes the mover to move the retainer into the engaged position, the mover further including a weighted segment which facilitates the mover moving the retainer;
   a resilient connector which resiliently connects the mover to the retainer, the resilient connector allowing the mover to move relative to the retainer;
   a latch pin that supports the resilient connector, wherein the mover and the retainer are rotatably mounted to the latch pin; and
   a return connected to the retainer, the return moving the retainer from the engaged position to the disengaged position.

12. A latch for a disk drive, the disk drive including a storage disk, a head stack assembly which moves a transducer relative to the storage disk, and an outer diameter stop which limits the movement of the head stack assembly near an outer diameter of the storage disk, the latch comprising:
   a retainer movable between an engaged position and a disengaged position, the retainer retaining the head stack assembly near the outer diameter stop when the retainer is in the engaged position, the retainer allowing the head stack assembly to move away from the outer diameter stop when the retainer is in the disengaged position; and
   a mover for moving the retainer from the disengaged position to the engaged position, the mover being adapted to move relative to the retainer, the mover including a contact section that engages the head stack assembly causing the mover to move the retainer into the engaged position, the contact section being positioned near the outer diameter stop.

13. A latch for a disk drive, the disk drive including a storage disk, a head stack assembly which moves a transducer relative to the storage disk, and an outer diameter stop which limits the movement of the head stack assembly near an outer diameter of the storage disk, the latch comprising:
   a retainer movable between an engaged position and a disengaged position, the retainer retaining the head stack assembly near the outer diameter stop when the retainer is in the engaged position, the retainer allowing the head stack assembly to move away from the outer diameter stop when the retainer is in the disengaged position;
   a mover for moving the retainer from the disengaged position to the engaged position, the mover being adapted to move relative to the retainer; and
   a resilient connector which resiliently connects the mover to the retainer.

14. The latch of claim 13 further comprising a latch pin that supports the resilient connector, wherein the mover and the retainer are rotatably mounted to the latch pin.

15. The latch of claim 13 wherein the mover includes a weighted segment which facilitates the mover moving the retainer.

16. A disk drive including the latch of claim 13 and a landing zone positioned near the outer diameter of the storage disk, the landing zone supporting the transducer away from the storage disk when the retainer is in the engaged position.

17. The latch of claim 13 further comprising a return connected to the retainer, the return moving the retainer from the engaged position to the disengaged position.

18. The latch of claim 17 wherein the return is adapted to allow the retainer to remain in the engaged position momentarily before moving the retainer from the engaged position to the disengaged position.

* * * * *

UNITED STATES PATENT AND TRADEMARK OFFICE
CERTIFICATE OF CORRECTION

PATENT NO. : 6,381,102 B1  Page 1 of 1
DATED : April 30, 2002
INVENTOR(S) : Strom et al.

It is certified that error appears in the above-identified patent and that said Letters Patent is hereby corrected as shown below:

<u>Column 9,</u>
Line 41, please delete "claim 8" and replace it with -- claim 9 --.

Signed and Sealed this

Tenth Day of September, 2002

*Attest:*

*Attesting Officer*

JAMES E. ROGAN
*Director of the United States Patent and Trademark Office*